(12) United States Patent
Reasor et al.

(10) Patent No.: US 7,467,409 B2
(45) Date of Patent: Dec. 16, 2008

(54) AGGREGATING TRUST SERVICES FOR FILE TRANSFER CLIENTS

(75) Inventors: Sterling M. Reasor, Bellevue, WA (US); Zeke B. Odins-Lucas, Seattle, WA (US); Michael G. Q. Sheldon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 10/898,298

(22) Filed: Jul. 23, 2004

(65) Prior Publication Data

US 2005/0132227 A1    Jun. 16, 2005

Related U.S. Application Data

(60) Provisional application No. 60/529,413, filed on Dec. 12, 2003.

(51) Int. Cl.
*G06F 11/00*   (2006.01)
*G06F 12/14*   (2006.01)
*G06F 12/16*   (2006.01)
*G06F 15/18*   (2006.01)
*G08B 23/00*   (2006.01)

(52) U.S. Cl. ......................................... 726/22

(58) Field of Classification Search ...................... None
See application file for complete search history.

(56) References Cited

U.S. PATENT DOCUMENTS

| 2003/0065926 A1* | 4/2003 | Schultz et al. | 713/188 |
| 2003/0097409 A1* | 5/2003 | Tsai | 709/206 |
| 2004/0006704 A1* | 1/2004 | Dahlstrom et al. | 713/200 |
| 2004/0128355 A1* | 7/2004 | Chao et al. | 709/206 |
| 2004/0177120 A1* | 9/2004 | Kirsch | 709/206 |
| 2006/0100010 A1* | 5/2006 | Gatto et al. | 463/29 |

\* cited by examiner

*Primary Examiner*—Emmanuel L Moise
*Assistant Examiner*—Nadia Khoshnoodi
(74) *Attorney, Agent, or Firm*—Lee & Hayes, PLLC

(57) ABSTRACT

A trust evaluation framework exposes a common interface that may be used by file transfer clients in the process of retrieving or downloading a file. Using the common interface, each file transfer client can take advantage of multiple trust providers to evaluate the incoming file. In this way, disparate file transfer clients can present a common user experience for downloading or retrieving files. In addition, trust providers may be updated or added to the system without modifying the installed file transfer clients. This enables the user experience to be incrementally improved without updating the installed programs.

16 Claims, 5 Drawing Sheets

AGGREGATING TRUST SERVICES FOR FILE TRANSFER CLIENTS

CLAIM OF PRIORITY

This application claims the benefit of U.S. Provisional Application No. 60/529,413, filed Dec. 12, 2003.

TECHNICAL FIELD

This invention relates to downloading files over a wide area network, and more particularly to a uniform user experience when downloading files over the wide area network.

BACKGROUND OF THE INVENTION

The explosion of wide area networking, and in particular the Internet, has enabled people to share information in a way that has never been seen before. Many people currently collaborate and share information by exchanging files through their computers. They send files as attachments in e-mail. They transfer files through real-time chat clients. And they download files from the Internet. Tools have evolved to make file sharing very simple. Unfortunately, hackers are exploiting the simplicity of these mechanisms to proliferate viruses, spyware, and other malicious products. Often the hackers trick users by attaching a malicious payload to benign files, like including macro viruses in word processing documents. The hackers can then deliver that word processing document to others using any of the file sharing mechanisms just mentioned.

Today, basically every different type of program that supports file transfers implements its own type of mechanism for protecting against malicious or otherwise dangerous files. Most of the programs block specific "dangerous" file types (such as executable files) and provide strong warnings for less dangerous file types (such as word processing documents). This brute force model provides some protection, but it suffers from several problems. For instance, simply blocking all transfers of a particular type of file most often prevents valid file transfers. Users are frustrated because their options are generally to either trust all files of a particular type, or none at all. Users would prefer a more sophisticated discrimination tool.

Another problem is that each type of program that supports file transfers is essentially duplicating code because much of the trust evaluation being performed on incoming files is the same. Still another problem is that existing file transfer programs commonly prompt the user with inconsistent dialogs that can sometimes make less sophisticated users wonder whether they have made a mistake when downloading a file with an unfamiliar application, such as a new chat program. Different file transfer programs could also have different levels of trust associated with the same file type, leading to inconsistent trust determinations being made based on which file transfer program is used to download the file. And finally, users cannot take advantage of developments in trust evaluation technology without upgrading each of their installed file transfer programs.

These and other problems in the area of file transfers have vexed software developers for some time.

SUMMARY OF THE INVENTION

The present invention provides a mechanism for safely exchanging files and reducing the number of prompts a user sees. A trust service manager is provided that exposes a common interface to file transfer clients. The trust service manager is also in communication with a plurality of trust providers. As a file transfer client receives an attachment, the file transfer client calls the trust service manager to evaluate the trust level of the attachment. The user is presented with an appropriate level of prompting based on the trust level. The appropriate level of trust may include blocking the attachment, prompting the user to explicitly accept the attachment, accepting the attachment without prompting, and the like.

DETAILED DESCRIPTION

The system described here is one embodiment of an infrastructure for aggregating trust providers and making those trust providers available to multiple file transfer clients. Generally stated, the framework exposes a common interface that may be used by file transfer clients in the process of retrieving or downloading a file. Using the common interface, each file transfer client can take advantage of multiple trust providers to evaluate the incoming file. In this way, disparate file transfer clients can present a common user experience for downloading or retrieving files. In addition, trust providers may be updated or added to the system without modifying the installed file transfer clients. This enables the user experience to be incrementally improved without updating the installed programs. What follows is a detailed description of one particular implementation of such a framework.

Figure 1:
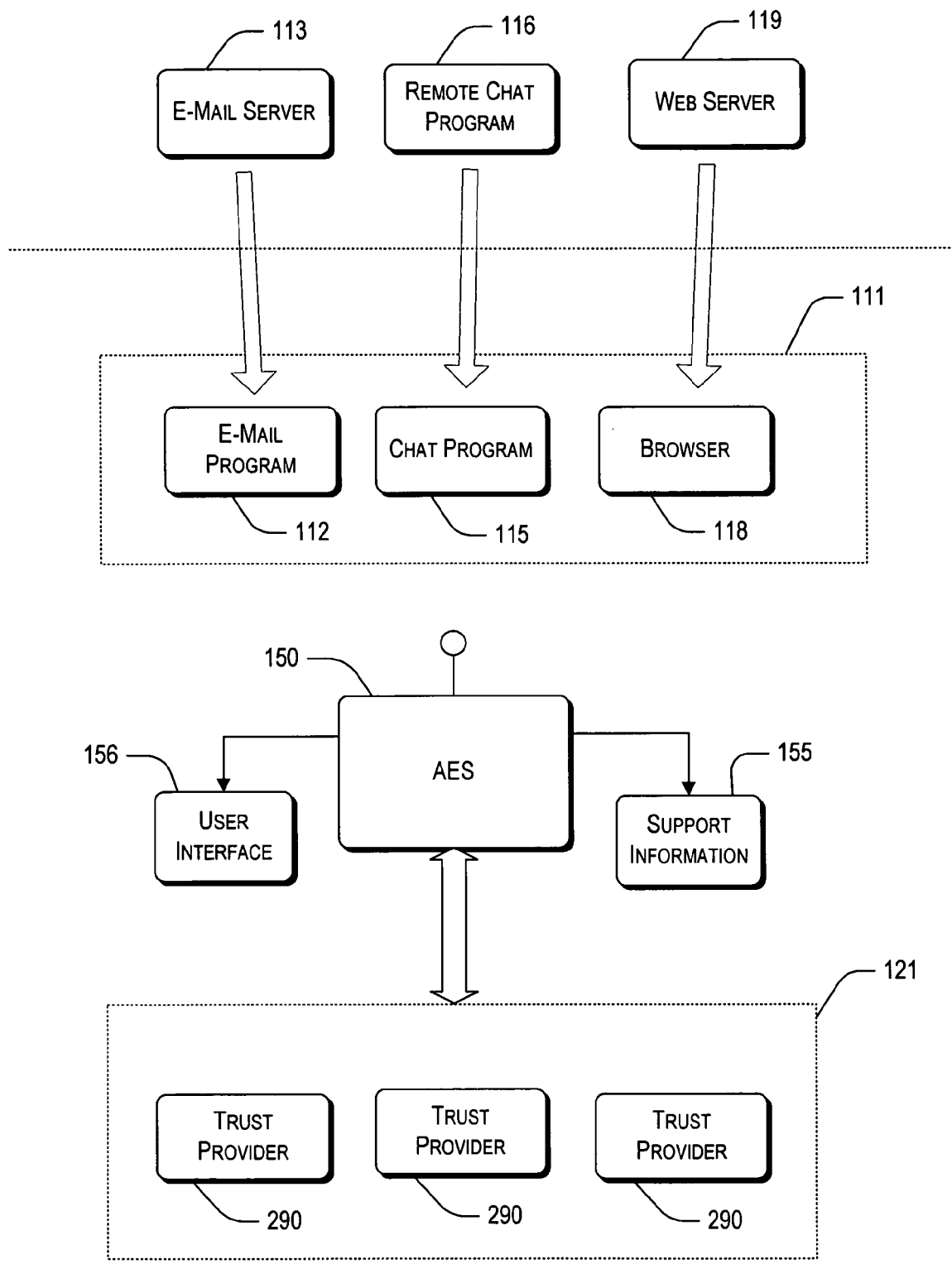
FIG. 1 is a functional block diagram generally illustrating elements of a trust evaluation framework that centralizes the trust evaluation of file transfers.

FIG. 1 is a functional block diagram generally illustrating elements of a trust evaluation framework that centralizes the trust evaluation of file transfers. Shown are a group of file transfer clients 111, a group of trust providers 121, and a trust service manager 150. These elements reside on a host computer 101, which is connected to other computers over a network, such as the Internet or an intranet.

Each file transfer client 111 is an example of a program that is capable of downloading or otherwise retrieving a file form another computer over the network. For example, an e-mail program 112 is configured to receive e-mail messages from an e-mail server 113. The e-mail messages may include an attached file. Similarly, a chat program 115 is configured to communicate with a remote chat program 116 over the network. Many such chat programs include the ability to transfer files from one chat program to the other. A browser 118 is another common file transfer client that may be configured to retrieve files over the network from various sources, such as a Web server 119 or a File Transfer Protocol (FTP) server (not shown). As used in this document, the term "attachment" means any file that is retrieved, downloaded, or otherwise brought to the host computer 101 from a remote computer regardless of the type of file transfer client.

Each of the trust providers 121 is a utility, service, or other program configured to evaluate a particular characteristic of an attachment for security infirmities. For example, an anti-virus trust provider 130 may be an anti-virus utility configured to examine a file for the presence of a computer virus. Alternatively, the anti-virus trust provider 130 may be configured to simply determine whether an anti-virus utility is installed and has been recently updated. Another trust provider 131 may be a digital signature verification utility configured to determine whether a digital signature associated with an attachment is authentic. Still another trust provider 132 may be configured to evaluate an attachment to determine if it is current, meaning that any applicable updates have been applied to the attachment. This trust provider 132 may be helpful to ensure that a file that has been downloaded includes any applicable security patches or the like prior to execution.

New trust providers may be added to the group of trust providers 121 without any modifications to the installed file transfer clients 111. Likewise, existing trust providers 121 may be updated to reflect the latest technology independent of the file transfer clients 111.

The trust service manager 150 is a program or component that exposes a common interface through which any one or more of the file transfer clients 111 may have an attachment evaluated using each of the trust providers 121. One illustrative implementation of the trust service manager 150 is described in detail in FIG. 3 below. Generally stated, the trust service manager 150 exposes an interface that may be called by any one of the file transfer clients 111 upon receiving an attachment. In response, the trust service manager 150 invokes each registered trust provider to evaluate the attachment. The trust service manager 150 may also maintain support information 155, such as trust provider registrations and trust policies, and include user interface data 156, such as common user prompts and the like.

Each of the file transfer clients 111 is configured to call the trust service manager 150 to have an attachment evaluated rather than (or in addition to) any custom trust evaluations performed directly by the file transfer client. In this way, a common set of trust evaluations may be performed on files that are introduced to the host computer 101 regardless of the particular mechanism of introduction. When called, the trust service manager 150 in turn calls each of the trust providers 121 to evaluate the attachment.

It should be noted that not all of the trust providers 121 need necessarily be called upon to evaluate the attachment. For instance, a particular trust provider may be configured to evaluate whether a word processing document attachment includes macros, and thus potentially a macro virus. Of course, if an attachment being evaluated is not a word processing document, then that trust provider need not be invoked.

Figure 2:
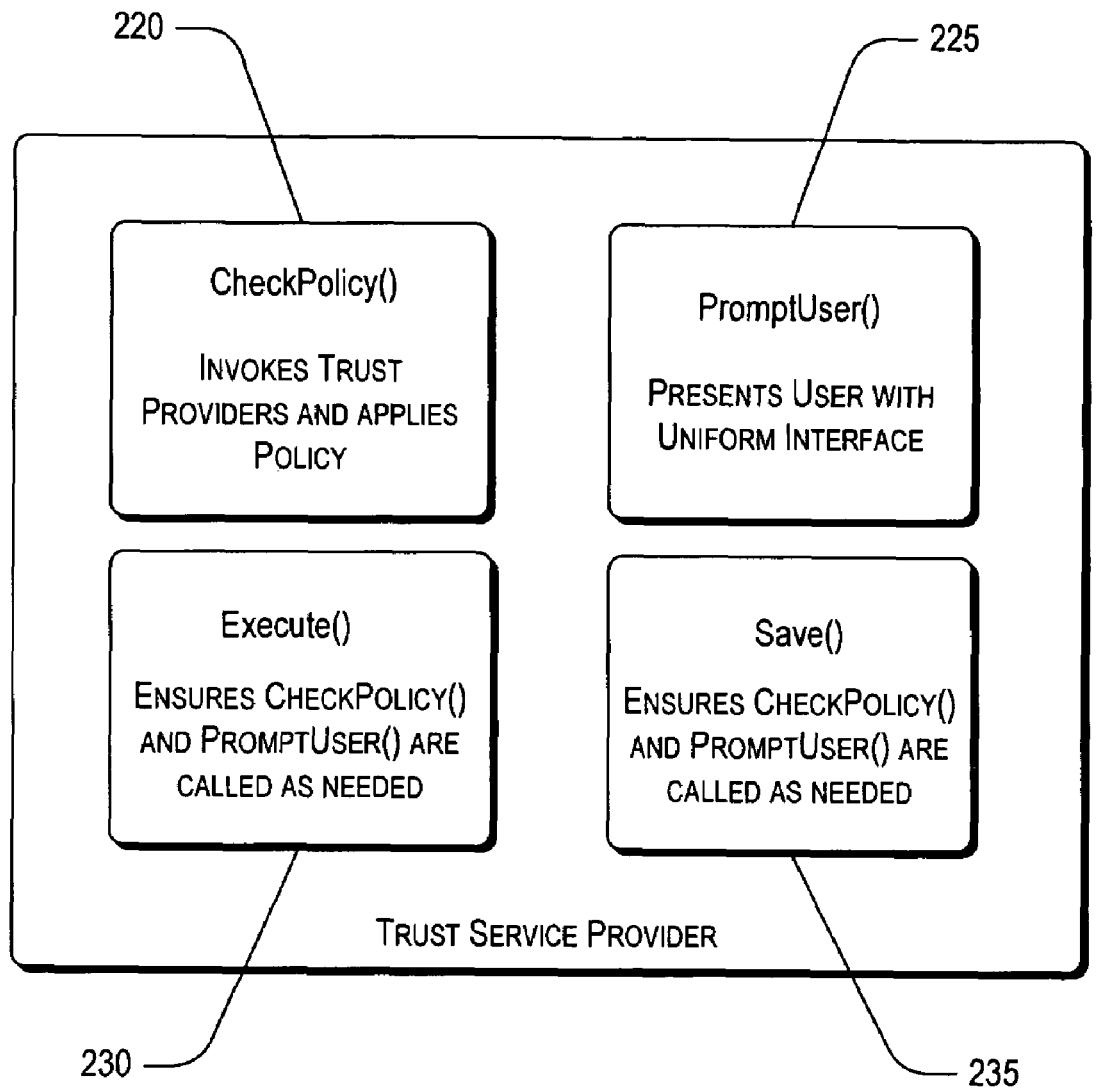
FIG. 2 is a functional block diagram illustrating in greater detail functional components of the trust service manager.

FIG. 2 is a functional block diagram illustrating in greater detail functional components of the trust service manager 150. In this particular implementation, the trust service manager 150 is embodied as four API calls that may be called by any one or more of the file transfer clients 111. Each of these calls contributes to a particular function of the infrastructure described here. Although described here as four functional components, it will be appreciated that the core functionality of the trust service manager 150 may be embodied in a fewer or greater number of calls. In addition, a more comprehensive interface definition is provided in the Appendix The trust service manager 150 includes a CheckPolicy( ) component 220 that may be called by a file transfer client 111 to initiate an evaluation of an attachment. The CheckPolicy( ) component 220 is configured to invoke each registered trust provider to evaluate a particular attachment that is provided. In this implementation, the CheckPolicy( ) component 220 effectively causes the attachment to have a safety rating determined based on the results of applying each trust provider. The CheckPolicy( ) component 220 may base its safety rating on stored configuration settings, such as whether particular file types should always be blocked or only if certain other criteria are met. For example, when the Execute( ) component (below) is called, the CheckPolicy( ) component 220 may cause a word processing attachment to be evaluated by a trust provider configured to determine whether the word processing attachment includes macros. The CheckPolicy( ) component 220 may attach a different safety rating to the attachment based on whether the attachment includes a macro or not. A file transfer client 111 may call the CheckPolicy( ) component 220 directly.

Figure 3:
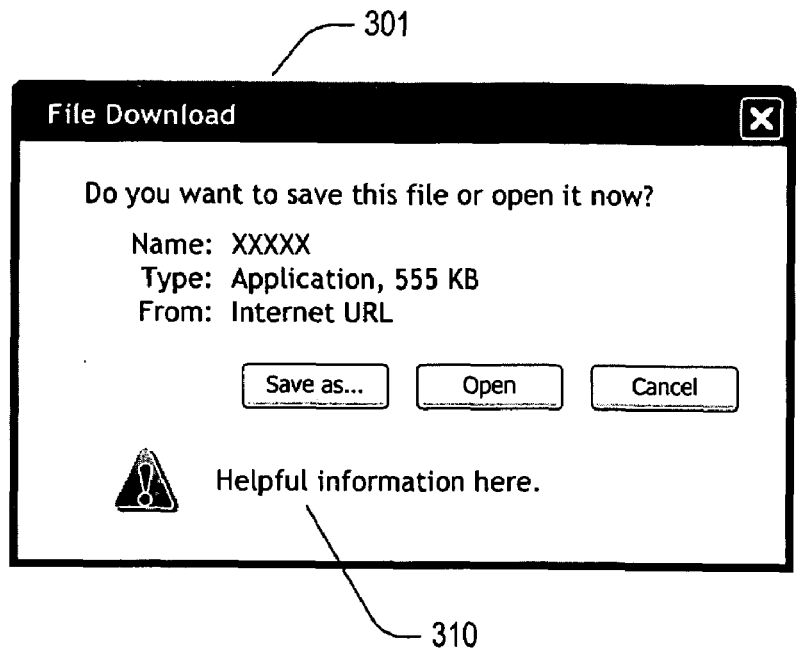
FIGS. 3 and 4 are graphical illustrations of illustrative user prompts that may be presented by the PromptUser( ) component.
Figure 4:
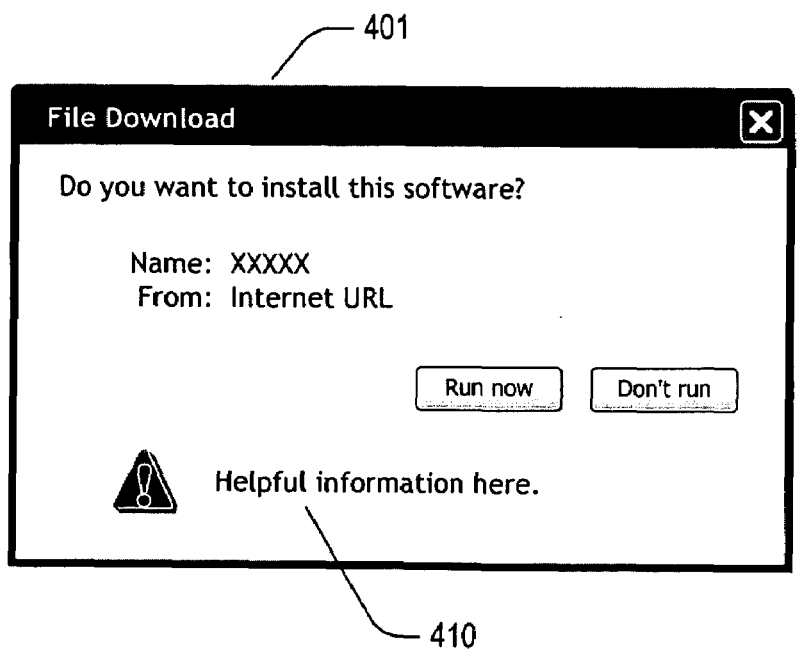

The trust service manager 150 also includes a Prompt User( ) component 225 that is configured to present the user with the appropriate prompt based on the safety rating assigned by the CheckPolicy( ) component 220. Examples of the types of prompts that may be presented include prompting the user to determine whether to allow a file to execute, prompting the user to determine whether to save the attachment, notifying the user that the attachment is unsafe and has been blocked, or not prompting the user at all (in the case of a safe attachment). Particular prompts that may be presented to the user are illustrated in FIG. 3 and FIG. 4, and described below. In response to the user's selection when prompted, the PromptUser( ) component 225 may abandon the file transfer, or invoke one of the other components described next.

The trust service manager 150 includes an Execute( ) component 230 that is configured to cause the attachment to be executed. If the attachment is determined to be safe, the Execute( ) component 230 may be invoked to cause the attachment to be executed. Calling the Execute( ) component 230 causes the trust service manager 150 to first invoke the CheckPolicy( ) component 220 and/or the PromptUser( ) component 225 as needed. File transfer programs constructed in accordance with existing technologies often call a common interface to cause an attachment to be executed. One example of such a common interface may be a ShellExecute( ) command. Accordingly, the Execute( ) component 230 of this implementation provides an intuitive migration path for existing technologies. File transfer programs may take advantage of the aggregated trust providers by calling the Execute( ) component 230, which in turn invokes the evaluation components of the system.

The trust service manager 150 also includes a Save( ) component 235, which is configured to commit the attachment to permanent storage. The Save( ) component 235 operates much as the Execute( ) component 230 except that rather than causing the attachment to be launched, the attachment is merely saved. When called, the Save( ) component 235 also invokes the evaluation components of the system, e.g. the CheckPolicy( ) component 220. In this implementation, the Save( ) component 235 is configured to persist information related to where the attachment may have come from to help improve security. For example, a file downloaded from a particular zone having a restricted level of security may be saved in conjunction with that level of security. Then, when later launched, the same level of security can be applied to the file.

The trust service manager 150 could also include other functional components, such as a CheckAttachment( ) call that could cause the trust providers to be invoked without completing the execution or save of the attachment. In this way, a file transfer client can still present custom UI if desired.

FIGS. 3 and 4 are graphical illustrations of illustrative user prompts that may be presented by the PromptUser( ) component 225. FIG. 3 illustrates one example of a prompt 301 that may be presented to request a user whether to save an attachment. The prompt 301 may include helpful information 310, including an iconic warning, about the particular security level associated with the attachment. FIG. 4 illustrates one example of a prompt 401 that may be presented to request a user whether to execute an attachment.

Figure 5:
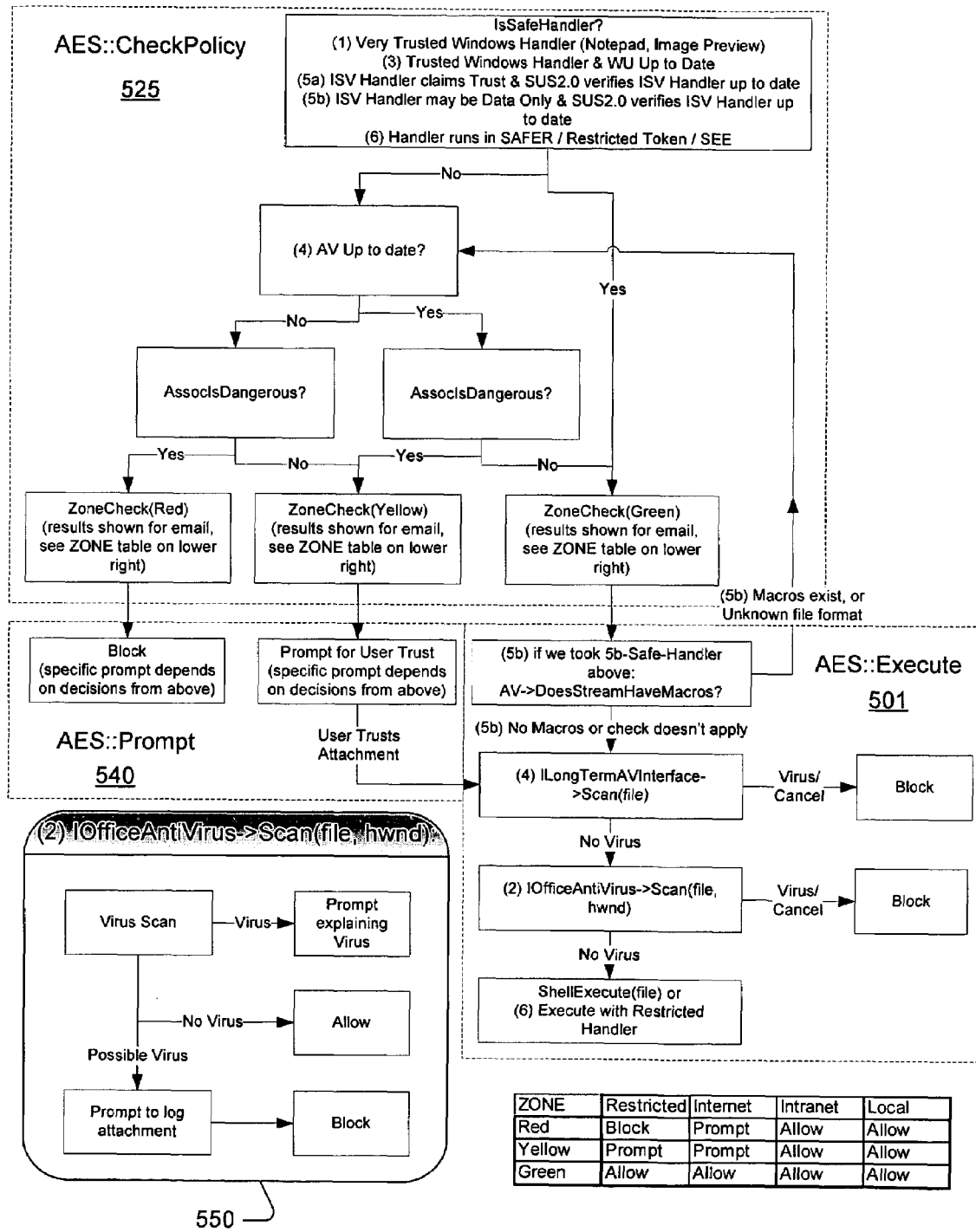
FIG. 5 is a logical flow diagram illustrating one particular example trust evaluation of an attachment using the system described above.

FIG. 5 is a logical flow diagram illustrating one particular example trust evaluation of an attachment using an embodiment of the system described above. The example illustrates what might happen when a file transfer client calls the Execute( ) component 501, which ensures that the CheckPolicy( ) component 525 of the trust service manager, is called to evaluate an attachment. The CheckPolicy( ) component 525 begins by calling a first trust provider, which in this case evaluates whether the handler for the particular file type of the attachment is known to be safe. If so, then the CheckPolicy( ) component 525 identifies the attachment as being a particular safety level (Green in this example). If the handler is not known to be safe, the CheckPolicy( ) component 525 determines if an anti-virus utility is installed and up to date. The CheckPolicy( ) component 525 also invokes another trust provider to determine if the file association is dangerous.

If an anti-virus utility is not installed and the association is dangerous, the CheckPolicy( ) component 525 identifies the attachment as being highly dangerous. If an anti-virus utility is not installed by the association is not dangerous, the CheckPolicy( ) component 525 identifies the attachment as being somewhat dangerous (yellow in this example). If an anti-virus utility is installed and the association is dangerous, the CheckPolicy( ) component 525 identifies the attachment as being somewhat dangerous. If an anti-virus utility is installed and the association is not dangerous, the CheckPolicy( ) component 525 identifies the attachment as being safe.

The CheckPolicy( ) component 525 then passes control to the PromptUser component 540, or simply allows the download to proceed by invoking the Execute( ) component 501. Based on the particular classification just provided, the PromptUser( ) component 540 either blocks the attachment or prompts the user for a trust determination (e.g., asks the user whether to allow the download to proceed) and then passes control to the Execute( ) component 501. The Execute( ) component 501 then attempts to commit the attachment to disk, which invokes the installed anti-virus utility 550. Based on whether the attachment is infected with a virus, the attachment is either committed to disk and executed, or blocked.

Figure 6:
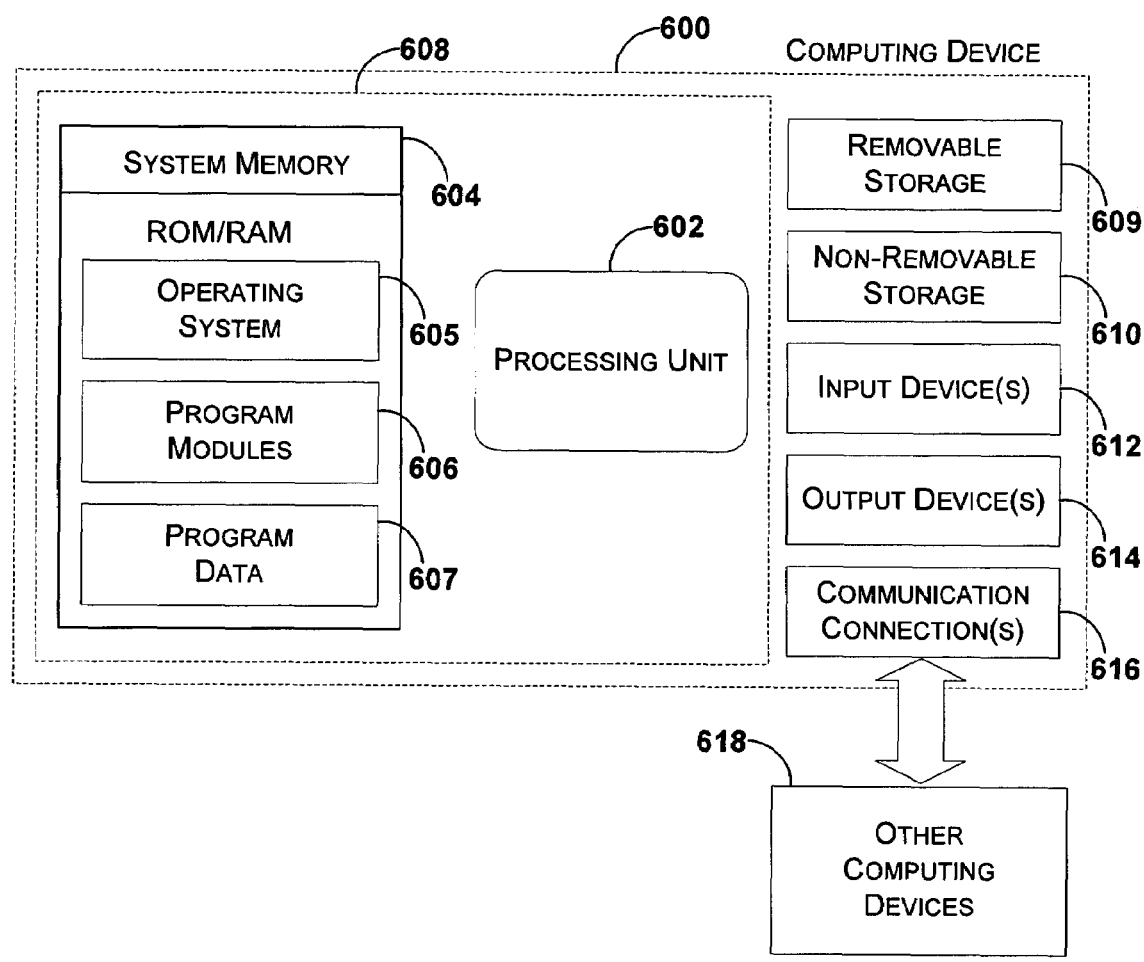
FIG. 6 is a functional block diagram illustrating an exemplary computing device that may be used in embodiments of the methods and mechanisms described in this document.

FIG. 6 is a functional block diagram illustrating an exemplary computing device that may be used in embodiments of the methods and mechanisms described in this document. In a very basic configuration, computing device 600 typically includes at least one processing unit 602 and system memory 604. Depending on the exact configuration and type of computing device, system memory 604 may be volatile (such as RAM), non-volatile (such as ROM, flash memory, etc.) or some combination of the two. System memory 604 typically includes an operating system 605, one or more program modules 606, and may include program data 607. This basic configuration is illustrated in FIG. 6 by those components within dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well know in the art and need not be discussed at length here.

Computing device 600 may also contain communication connections 616 that allow the device to communicate with other computing devices 618, such as over a network. Communication connections 616 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

Appendix—Sample Interface Definition

```
//-------------------------------------------------------------------
    // IAttachmentExecute
    [
      object,
      uuid(73db1241-1e85-4581-8e4f-a81e1d0f8c57),          //
IID_IAttachmentExecute
      local,
      pointer_default(unique),
    ]
    interface IAttachmentExecute : IUnknown
    {
      //
      // IAttachmentExecute - COM object designed to help client applications
      //   safely manage saving and opening attachments for users.
      //   clients are assumed to have some policy/settings already
      //   to determine the support and behavior for attachments.
      //   this API assumes that the client is interactive with the user
      //
```

-continued

```
            // ClientTitle - (optional) caller specific title for the prompt
            //     if unset, the prompts come with a default title of "File
Download"
            HRESULT SetClientTitle([in, string] LPCWSTR pszTitle);
            // ClientGuid - (optional) for storing user specific settings
            //     someprompts are allowed to be avoided in the future if the
user
            //     chooses. that choice is stored on per-client basis indexed by
the ClientGuid
            HRESULT SetClientGuid([in] REFGUID guid);
            // EVIDENCE properties
            // LocalPath - (REQUIRED) path that would be passed to
ShellExecute( )
            //     if FileName was already used for the Check( ) and
Prompt( ) calls,
            //         and the LocalPath points to a different handler than
predicted,
            //     previous trust may be revoked, and the Policy and User trust
re-verified.
            HRESULT SetLocalPath([in, string] LPCWSTR pszLocalPath);
            // FileName - (optional) proposed name (not path) to be used to
construct LocalPath
            //     optionally use this if the caller wants to perform Check( )
before copying
            //     the file to the LocalPath. (eg, Check( ) proposed download)
            HRESULT SetFileName([in, string] LPCWSTR pszFileName);
            // Source - (optional) alternate identity path or URL for a file
transfer
            //     used as the primary Zone determinant. if this is NULL
default to the Restricted Zone.
            //     may also be used in the Prompt( ) UI for the "From" field
            //     may also be sent to handlers that can process URLs
            HRESULT SetSource([in, string] LPCWSTR pszSource);
            // Referrer - (optional) Zone determinant for container or link
types
            //     only used for Zone/Policy
            //         container formats like ZIP and OLE packager use the
Referrer to
            //     indicate indirect inheritance and avoid Zone elevation.
            //         Shortcuts can also use it to limit elevation based on
parameters
            HRESULT SetReferrer([in, string] LPCWSTR pszReferrer);
            // CheckPolicy( ) - examines available evidence and checks the
resultant policy
            //   * requires FileName or LocalPath
            //
            // Returns S_OK for enable
            //         S_FALSE for prompt
            //         FAILURE for disable
            //
            HRESULT CheckPolicy( );
            typedef enum tagATTACHMENT_PROMPT
            {
                ATTACHMENT_PROMPT_NONE        = 0x0000,
                ATTACHMENT_PROMPT_SAVE        = 0x0001,
                ATTACHMENT_PROMPT_EXEC        = 0x0002,
                ATTACHMENT_PROMPT_EXEC_OR_SAVE = 0x0003,
            }ATTACHMENT_PROMPT;
            typedef enum tagATTACHMENT_ACTION
            {
                ATTACHMENT_ACTION_CANCEL      = 0x0000,
                ATTACHMENT_ACTION_SAVE        = 0x0001,
                ATTACHMENT_ACTION_EXEC        = 0x0002,
            }ATTACHMENT_ACTION;
            // Prompt( ) - application can force UI at an earlier point,
            //     even before the file has been copied to disk
            //   * requires FileName or LocalPath
            HRESULT    Prompt([in]    HWND    hwnd,    [in]
ATTACHMENT_PROMPT prompt, [out] ATTACHMENT_ACTION
*paction);
            // Save( ) - should always be called if LocalPath is in not in
a temp dir
            //   * requires valid LocalPath
            //   * called after the file has been copied to LocalPath
            //   * may run virus scanners or other trust services to validate
the file.
            //     these services may delete or alter the file
            //   * may attach evidence to the LocalPath
            HRESULT Save( );
            // Execute( ) - will call Prompt( ) if necessary, with the EXEC
action
            //   * requires valid LocalPath
            //   * called after the file has been copied to LocalPath
            //   * may run virus scanners or other trust services to validate
the file.
            //     these services may delete or alter the file
            //   * may attach evidence to the LocalPath
            //
            //   phProcess - if non-NULL Execute( ) will be synchronous
and return an HPROCESS if available
            //       if null Execute( ) will be async, implies
that you have a message pump and a long lived window
            //
            HRESULT Execute([in] HWND hwnd, [in, string] LPCWSTR
pszVerb, HANDLE *phProcess);
            };
```

The invention claimed is:

1. A system for evaluating an attachment, comprising:
a host computer;
a trust service manager on the host computer configured to expose a common interface through which one or more file transfer client evaluates an attachment utilizing a plurality of trust providers, the trust service manager comprising:
a commitment component, the commitment component being operative to cause the attachment to be committed to an identified transfer client and to invoke a check policy component;
the check policy component being configured to invoke one or more of the plurality of trust providers to evaluate the attachment prior to the attachment being committed by the commitment component, wherein the check policy component is further configured to determine an aggregate trust score for the attachment based on the evaluations of the trust providers, wherein if the aggregated trust score for the attachment fails a threshold, then:
the check policy component determines if an antivirus utility is installed and up to date on the host computer, wherein, based upon the aggregate trust score and the availability and up to date condition of the antivirus utility on the host computer, the check policy component assigns a final safety level for the attachment;
a prompt user component;
an execute component; and
a save component, wherein the save component is configured to retain information related to where the attachment came from.

2. The system recited in claim 1, wherein the plurality of trust providers comprises an anti-virus utility.

3. The system recited in claim 1, wherein the plurality of trust providers comprises a digital signature verification utility.

4. The system recited in claim 1, wherein the plurality of trust providers comprises a utility to determine whether any applicable updates have been applied to the attachment.

5. The system recited in claim 1, wherein the file transfer client is a utility operative to retrieve the attachment from a remote location.

6. The system recited in claim 1, wherein the commitment component is operative to cause the attachment to be launched on the identified transfer client utilizing the execute component.

7. The system recited in claim 1, wherein the commitment component is operative to cause the attachment to be saved to the identified transfer client utilizing the save component.

8. The system recited in claim 1, wherein the prompt user component prompts a user for a security determination if the final safety level does not satisfy a security threshold.

9. The system recited in claim 1, wherein the check policy component is configured to invoke one or more of the trust providers to evaluate the attachment after the attachment has been committed by the commitment component.

10. The system recited in claim 9, wherein the commitment component is operative to cause the attachment to be launched on the identified transfer client utilizing the execute component.

11. The system recited in claim 9, wherein the commitment component is operative to cause the attachment to be saved to the identified transfer client utilizing the save component.

12. A computer storage media having computer-executable instructions for evaluating an attachment, the instructions comprising:

in response to a retrieval of the attachment being initiated by a host computer, invoking a trust service manager configured to expose a common interface through which one or more file transfer client evaluates an attachment utilizing a plurality of trust providers, the trust service manager comprising:

a commitment component, the commitment component being operative to cause the attachment to be committed to an identified transfer client and to invoke a check policy component;

the check policy component being configured to invoke one or more of the plurality of trust providers to evaluate the attachment prior to the attachment being committed by the commitment component, wherein the check policy component is further configured to determine an aggregate trust score for the attachment based on the evaluations of the trust providers, wherein if the aggregated trust score for the attachment fails a threshold, then:

the check policy component determines if an antivirus utility is installed and up to date on the host computer, wherein, based upon the aggregate trust score and the availability and up to date condition of the antivirus utility on the host computer, the check policy component assigns a final safety level for the attachment;

a prompt user component;

an execute component; and a save component, wherein the save component is configured to retain information related to where the attachment came from.

13. The computer storage media recited in claim 12, wherein the commitment component is operative to cause the attachment to be launched on the file transfer client utilizing the execute component based on a satisfactory final safety level.

14. The computer storage media recited in claim 12, wherein the commitment component is operative to cause the attachment to be saved to the local device utilizing the save component based on a satisfactory final safety level.

15. The computer storage media recited in claim 12, further comprising, if the final safety level does not satisfy a security threshold, prompting a user utilizing the prompt user component for a security determination.

16. The computer storage media recited in claim 12, further comprising, if the final safety level satisfies a security threshold, committing the attachment on the file transfer client utilizing the save component without prompting a user.

* * * * *